(12) United States Patent
Masuoka et al.

(10) Patent No.: US 7,059,730 B2
(45) Date of Patent: Jun. 13, 2006

(54) BACK REFLECTIVE MIRROR AND BACK PROJECTION TYPE VIDEO DISPLAY DEVICE USING THE SAME

(75) Inventors: Nobuo Masuoka, Chigasaki (JP); Koji Hirata, Yokohama (JP); Kei Adachi, Yokohama (JP); Sadayuki Nishimura, Yokohama (JP); Megumi Sakoo, Yokohama (JP); Yoshie Kodera, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 10/804,617

(22) Filed: Mar. 18, 2004

(65) Prior Publication Data

US 2004/0246611 A1 Dec. 9, 2004

(30) Foreign Application Priority Data

Apr. 24, 2003 (JP) .............................. 2003-119196

(51) Int. Cl.
G03B 21/22 (2006.01)
G03B 21/28 (2006.01)
G03B 21/56 (2006.01)
G02B 5/22 (2006.01)
H04N 5/64 (2006.01)

(52) U.S. Cl. ..................... 353/98; 353/74; 353/77; 353/78; 348/794; 359/456; 359/460; 359/883

(58) Field of Classification Search ............... 353/74, 353/77, 78, 98; 348/794; 359/456, 460, 359/883
See application file for complete search history.

(56) References Cited

U.S. PATENT DOCUMENTS

| 5,506,642 A | 4/1996 | Suzuki et al. ................. 353/74 |
| 6,203,162 B1 | 3/2001 | Yamashita et al. ........... 359/883 |
| 6,264,341 B1 * | 7/2001 | Yamashita et al. ........... 359/883 |
| 6,565,222 B1 * | 5/2003 | Ishii et al. ................... 359/883 |
| 6,650,472 B1 * | 11/2003 | Adachi et al. .............. 359/453 |

FOREIGN PATENT DOCUMENTS

| JP | 93-311207 | 12/1997 |
| JP | 2001-235798 | 8/2001 |
| JP | 2001-295059 | 10/2001 |
| JP | 2002-267823 | 9/2002 |
| JP | 2003-255467 | 9/2003 |

* cited by examiner

*Primary Examiner*—Melissa Jan Koval
(74) *Attorney, Agent, or Firm*—Townsend and Townsend and Crew LLP

(57) ABSTRACT

In the present invention, there is disclosed a reflective mirror whose contrast or resolution performance is equal to that of a surface mirror of a glass mirror for general use and which does not have any problem in reliability of resistance to environment and whose color shift or brightness performance is inhibited from being degraded. For this, in the present invention, a reflective film is formed on a glass substrate by use of silver mirror reaction, and a topcoat is formed of a colorless/transparent resin. At this time, a wavelength of a crest of a ripple indicated by a reflectance characteristic is constituted to substantially agree with that of a green luminescent line. Accordingly, a back projection type video display device which is satisfactory in the contrast or resolution performance can be prepared.

14 Claims, 7 Drawing Sheets

BACK REFLECTIVE MIRROR AND BACK PROJECTION TYPE VIDEO DISPLAY DEVICE USING THE SAME

BACKGROUND OF THE INVENTION

The present invention relates to a back projection type video display device in which an optical image is projected from a screen back side by a projection unit for projecting the optical image in response to a video signal, and a back reflective mirror for use in the device. The back reflective mirror changes an optical path of a projected video light in a screen direction. For the back reflective mirror of the present invention, the reflective surface is formed of a metal thin film, and a topcoat is formed of a colorless/transparent resin on the surface of the metal thin film for protection of the surface.

For a reflective mirror (hereinafter referred to as the back mirror) for use in a back projection type video display device for projection onto a screen from a back side to change an optical path of a projected video light in a screen direction, a mirror described, for example, in JP-A-2001-235798 is known. That is, a reflective film of aluminum (Al) is formed on a glass substrate by vacuum evaporation or vacuum sputtering which is a vacuum film forming process, and an amplified reflective film having a film thickness of 0.2 to 0.3 μm is formed of a transparent inorganic material on the reflective film by the vacuum evaporation. This glass mirror is superior in smoothness, reliability of resistance to environment and the like.

However, the back mirror for use in the back projection type video display device has a large size, a film forming device (e.g., sputtering device) for forming the reflective film is expensive, and makers capable of manufacturing the device are limited. Since an operation efficiency in forming the film by the vacuum evaporation, value sputtering or the like is low, a price of the back mirror is high.

On the other hand, in recent years, for example, a back mirror low in manufacturing cost has been used, including a film on which a reflective layer is formed, and the film is extended via a metal frame. The film-formed back mirror described, for example, in JP-A-9-311207 and shown in FIG. 2 is known. In this mirror, a metal thin film (Ag) is deposited on a film of a resin (PET), and a topcoat is formed of a colorless/transparent resin on the surface of the film. The Ag reflective film is formed by use of evaporation in the same manner as in the glass substrate, but a rolled film is used and wound up to form the film by the film forming device, and therefore there is an advantage that the film can be formed at a low cost.

As a film forming method of the reflective film, in addition to the above-described vacuum film forming method (vacuum evaporation method, value sputtering method), a spraying method described, for example, in JP-A-2001-295059 is known. In this method, a solution containing a metal salt and a reducer-containing solution are sprayed with respect to a material to be plated so that the material is plated. When this method is used, the expensive value film forming device (equipment) is not required, and therefore there is an advantage that the film can be formed at the low cost.

SUMMARY OF THE INVENTION

As described above, the reflective film formation by the value film forming method is high in cost. To solve the problem, when the spraying method or an electroless plating method is used as the film forming method of the reflective film, the film can be inexpensively formed. However, when a protective film is formed of a transparent inorganic material as the topcoat on the reflective film by the vacuum evaporation, the cost increases. To solve the problem, it has been thought that the film is formed of a transparent resin described in JP-A-9-311207.

However, in the back mirror described in this publication, a film thickness of the topcoat is set to 3 μm in order to prevent oxidation and sulfuration of an Ag film which is a reflective film formed on a PET film.

In general, a resin diluted in a solvent is applied as the topcoat, and the solvent is evaporated to harden the solution. For example, after a diluted solution (hereinafter referred to as the 10% diluted solution) containing 10% of resin and 90% of solvent is applied by about 30 μm, the solvent is evaporated to harden the solution, and the film thickness of the topcoat is finally about 3 μm. Here, if the resin diluted in the solvent is not uniformly mixed, and an evaporative speed is uneven depending on a place, the film thickness of the hardened topcoat fluctuates depending on the place (hereinafter referred to as the in-plane fluctuation). For example, when the in-plane fluctuation of the film thickness is generated by 10%, the in-plane fluctuation is 0.3 μm.

Therefore, as compared with a surface mirror of a general glass mirror, the mirror including the topcoat of the resin is large in in-plane fluctuation and bad in surface smoothness, and therefore there is a problem that a contrast or resolution performance is degraded.

To solve this, the film thickness of the topcoat may be reduced to reduce the in-plane fluctuation. For example, assuming that the in-plane fluctuation is generated by 10% and that the film thickness of the topcoat is 1 μm, the in-plane fluctuation is 0.1 μm, and the in-plane fluctuation can be reduced to ⅓ with respect to the film thickness of 3 μm. Therefore, the film thickness is proportional to the in-plane fluctuation. When the film thickness is reduced, the in-plane fluctuation is also reduced, and the smoothness of the surface is enhanced.

However, when the film thickness of the topcoat is reduced, drop of reliability of resistance to environment is considered such as the oxidation and sulfuration of the reflective film (Ag).

Moreover, when the film thickness of the topcoat is, for example, 3 μm or less, and is small, interference by the topcoat occurs. FIG. 2 shows reflectance characteristics of the back mirror in a case where the resin is used in the topcoat. In FIG. 2, a reflectance characteristic 30 shown by a dotted line shows the characteristic in a case where there is not any topcoat, and a reflectance characteristic 39 shown by a solid line shows the characteristic in a case where there is the topcoat. By the interference by the topcoat, an undulating shape (hereinafter referred to as the ripple) appears in the reflectance characteristic as in the reflectance characteristic 39 of FIG. 2. Therefore, since a quantity of light of a wavelength region of a valley (a) of this ripple lowers, a color shift or brightness performance is degraded.

The present invention has been developed in consideration of the above-described problems, and an object thereof is to provide a back mirror in which a color shift or brightness performance is inhibited from being degraded and price reduction is possible, and a back projection type video display device in which the back mirror is used.

To solve the above-described problems, in the present invention, there is provided a back reflective mirror which is used in a back projection type video display device for projecting an optical image onto a screen from a back side in response to a video signal by a projection unit and which changes an optical path of a projected video light from the projection unit in a screen direction, the mirror comprising: a glass substrate; a reflective film of silver or a silver alloy forming a reflective surface on the glass substrate; and a topcoat film formed of a transparent resin on the reflective film.

In this manner, the transparent resin film can be applied and formed as the topcoat of the back mirror, and cost reduction is possible. Furthermore, since the material of the reflective film is silver or the silver alloy, the reflective film can be formed by a spraying method or an electroless plating method, and further cost reduction is possible.

Moreover, when the film thickness of the topcoat film is set to 1 µm or less, and smoothness of the surface is enhanced, a contrast or resolution performance is enhanced.

Furthermore, the film thickness of the topcoat is set in such a manner that a wavelength of any crest of a ripple shape of a reflectance characteristic by the topcoat film substantially agrees with that of a green luminescent line of a light emitted from a light source of an optical unit, and accordingly color shift or brightness can be inhibited from being degraded.

Other objects, features and advantages of the invention will become apparent from the following description of the embodiments of the invention taken in conjunction with the accompanying drawings.

DETAILED DESCRIPTION OF THE PREFERRED EMBODIMENT

An embodiment of the present invention will be described hereinafter with reference to the drawings.

In the present invention, a back mirror for use in a back projection type video display device is a reflective mirror in which a single-layer topcoat of a colorless/transparent resin is formed as a protective film on a reflective film disposed on a substrate. Furthermore, a film thickness of the topcoat is set to 1 µm or less and to be small so that a contrast or resolution performance substantially equal to that of a general glass mirror is obtained. Furthermore, the topcoat film thickness is set to such an extent that a wavelength of a crest of a ripple caused by interference by a thin film is substantially equal to a green luminescent line wavelength of a projected video light projected from the projection unit or a light source built in the projection unit.

Figure 1:
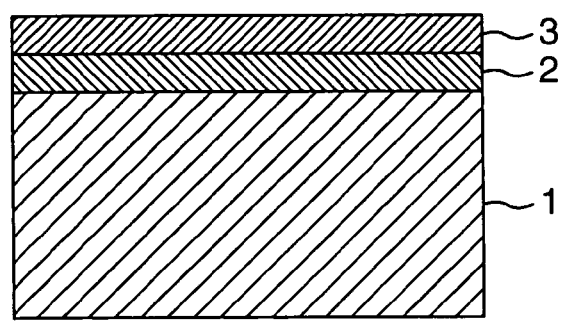
FIG. 1 is a constitution diagram of a back mirror according to an embodiment of the present invention.
Figure 2:
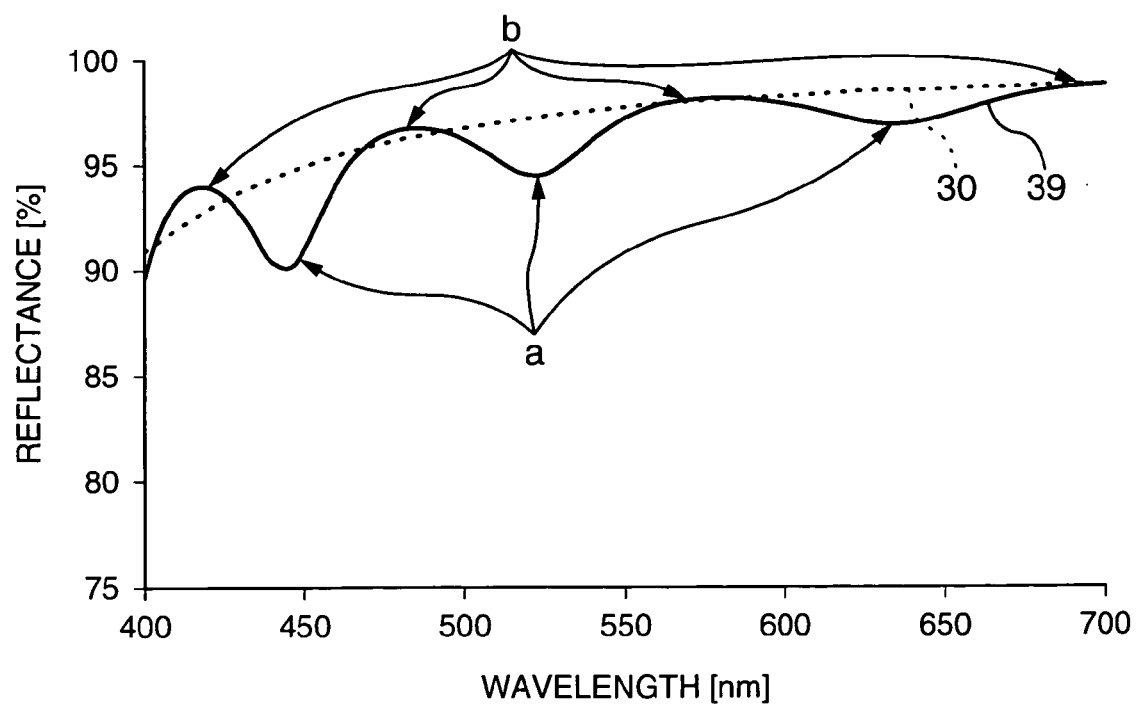
FIG. 2 is a reflectance characteristic diagram of the back mirror in a case where a resin is used in a topcoat.

FIG. 1 is a sectional view showing a constitution of a back mirror of an embodiment of the present invention, and FIG. 2 is a diagram showing a reflectance characteristic diagram of the back mirror.

First, the constitution of the back mirror will be described. In FIG. 1, reference numeral 1 denotes a substrate, 2 denotes a reflective film, and 3 denotes a topcoat which is a protective film for preventing the reflective film 2 from being corroded (oxidized), soiled, or damaged. Here, glass is used in the substrate 1, but the substrate is not limited to glass as long as a surface precision is satisfactory. The reflective film 2 is a thin film of silver which has a good reflectance, and is formed in a film thickness of about 100 to 200 nm. When the reflectance of silver is 60 nm or more, a high reflectance can be obtained in a range of a visible light. This film can be inexpensively prepared by a silver mirror reaction by use of a spraying method described, for example, in JP-A-2001-295059. The reflective film of silver may also be formed by an electroless plating method. The spraying or electroless plating method does not require an expensive equipment unlike a vacuum film forming process, and therefore has an advantage that the film can be inexpensively manufactured. The topcoat 3 which is the protective film is formed of a colorless/transparent resin. Examples of a topcoat material include an acrylic resin, and a two-pack acrylic urethane resin having a refractive index of about 1.5 is preferably used because the resin is easily applied.

In the back mirror, since the topcoat 3 has a single layer only of the resin, the interference occurs depending on the film thickness. For the interference by the topcoat 3, as shown by the reflectance characteristic 39 of the solid line in FIG. 2, the ripple is generated in the reflectance characteristic. The ripple depends on the film thickness and refractive index of the topcoat, and the shape of the ripple (reflectance characteristic) can be obtained by simulation.

Examples of software for the simulation includes optical thin film software "FILM*STAR" (U.S. FTG Software Associates Co.).

For the ripple, when the film thickness increases, a period of the ripple decreases, and accordingly an amplitude also decreases. With a certain film thickness or more, the amplitude of the ripple is not more than measurement limitation, and is inconspicuous. When the acrylic urethane resin having a refractive index of 1.5 has a film thickness of 3 µm or more, the ripple becomes inconspicuous, and this is known by experiments.

However, when the topcoat is the resin, the film thickness of the topcoat is proportional to a surface precision of the surface. When the film thickness is large, the surface precision is degraded, and a contrast or resolution performance lowers.

To obtain the contrast or resolution performance equal to that of a general glass mirror, the surface precision of the topcoat needs to be raised. Moreover, as a result of comparison/study with the general glass mirror, it has been seen that the contrast or resolution performance equal to that of the glass mirror is obtained with a film thickness of 1 µm or less.

Figure 14:
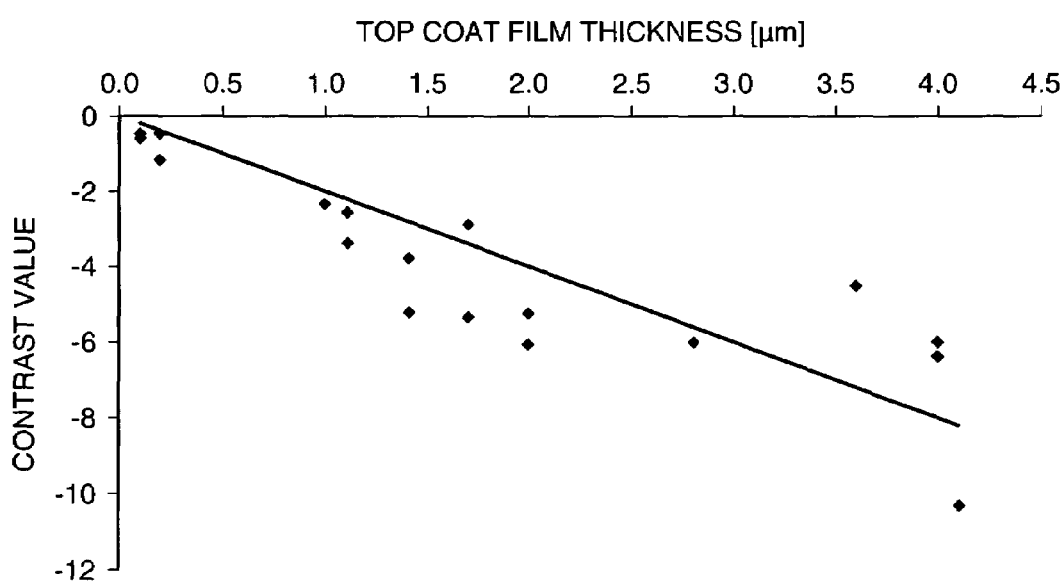
FIG. 14 is a diagram showing a relation between a topcoat film thickness and a contrast value.

FIG. 14 shows a relation between the topcoat film thickness and a contrast value. In FIG. 14, the contrast value of the glass mirror is assumed to be 0, and a difference of contrast with respect to the glass mirror is shown.

As shown in FIG. 14, it is seen that the film thickness of the topcoat is proportional to a drop in the contrast value. When two back projection type video display devices having different contrast values are arranged and compared with each other, it is seen that a difference of the contrast value of 2 or less cannot be visually judged. Then, a contrast value of −2 is regarded as a target specification. Therefore, the film thickness of the topcoat has to be set to 1 µm or less in order to obtain the contrast equal to that of the glass mirror.

However, when the film thickness is set to 1 µm or less, a large ripple exists in the reflectance characteristic as shown by a solid line of FIG. 2. Since a wavelength region of a portion of a valley (a) of the ripple has a low reflectance as compared with the film having no topcoat (dotted line), the brightness performance is degraded in the portion. That is, an ideal reflectance is a reflectance of the reflective mirror including no topcoat and having a characteristic shown by the dotted line, and the brightness performance is best.

Next, a relation between the wavelength of the crest of the ripple and the green luminescent line wavelength of the projected video light projected from the projection unit with the reduction of the film thickness of the topcoat will be described, which is a characteristic of the present invention.

Figure 3:
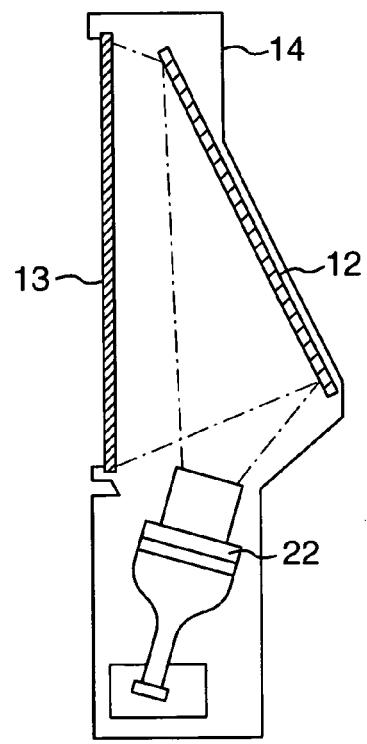
FIG. 3 is a sectional view showing a constitution of a back projection type video display device in which a projection tube is used.
Figure 4:
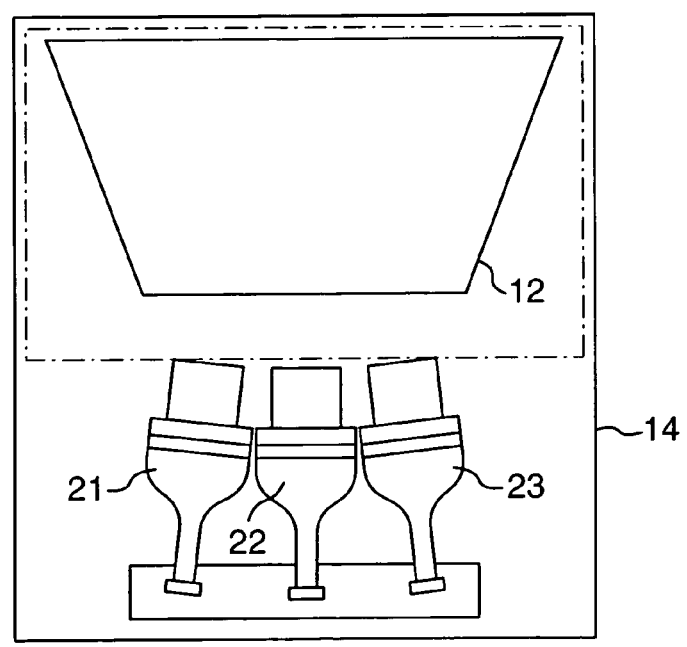
FIG. 4 is a front view of the back projection type video display device shown in FIG. 3.

FIGS. 3 and 4 show one embodiment of the back projection type video display device on which the back mirror is mounted. FIG. 3 is a constitution sectional view of the back projection type video display device in which a projection tube is used as the projection unit as seen from a side surface, and FIG. 4 is a constitution diagram seen from a front surface. In FIGS. 3 and 4, reference numeral 21 denotes a projection tube for red video projection, 22 denotes a projection tube for green video projection, 23 denotes a projection tube for blue video projection, 12 denotes a back mirror including a reflective surface formed of silver as shown in FIGS. 1, and 14 denotes a case. In the back projection type video display device, the projected video lights from the respective projection tubes 21, 22, 23 are projected on the back mirror 12, and reflected by the back mirror 12. Optical paths are changed in a screen 13 direction, and a projected image is shown on the screen 13 from the back side.

Figure 5:
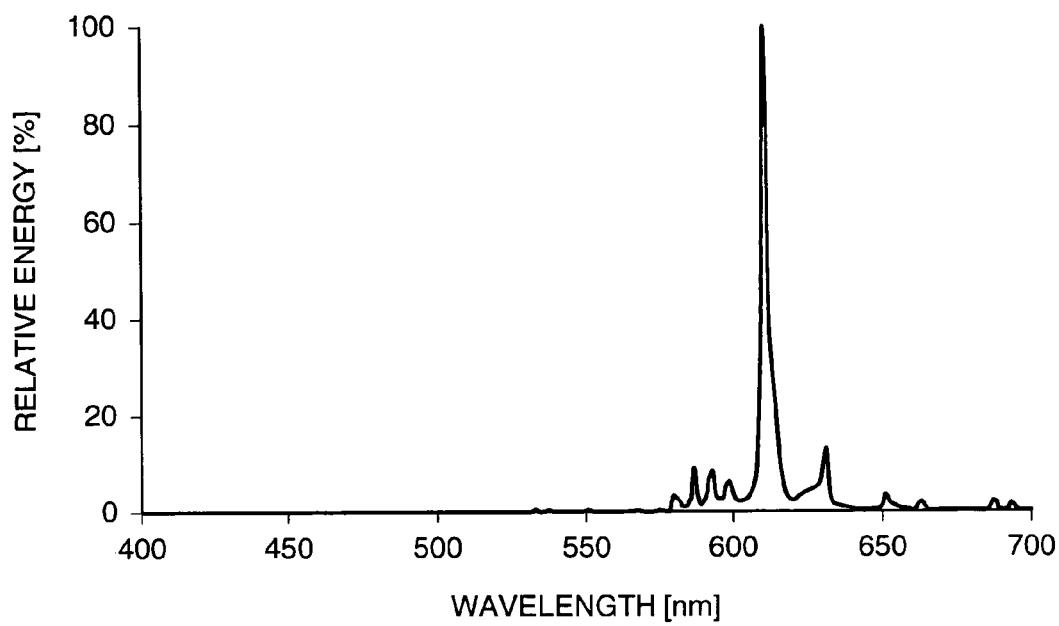
FIG. 5 is an emission energy distribution diagram of a video projection tube for red.
Figure 6:
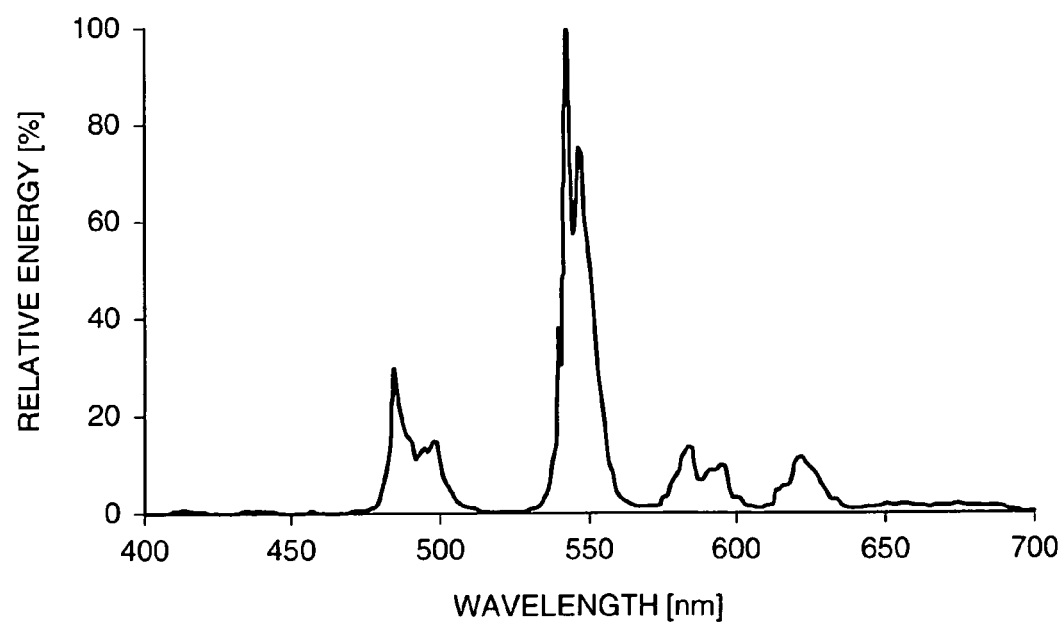
FIG. 6 is an emission energy distribution diagram of a video projection tube for green.
Figure 7:
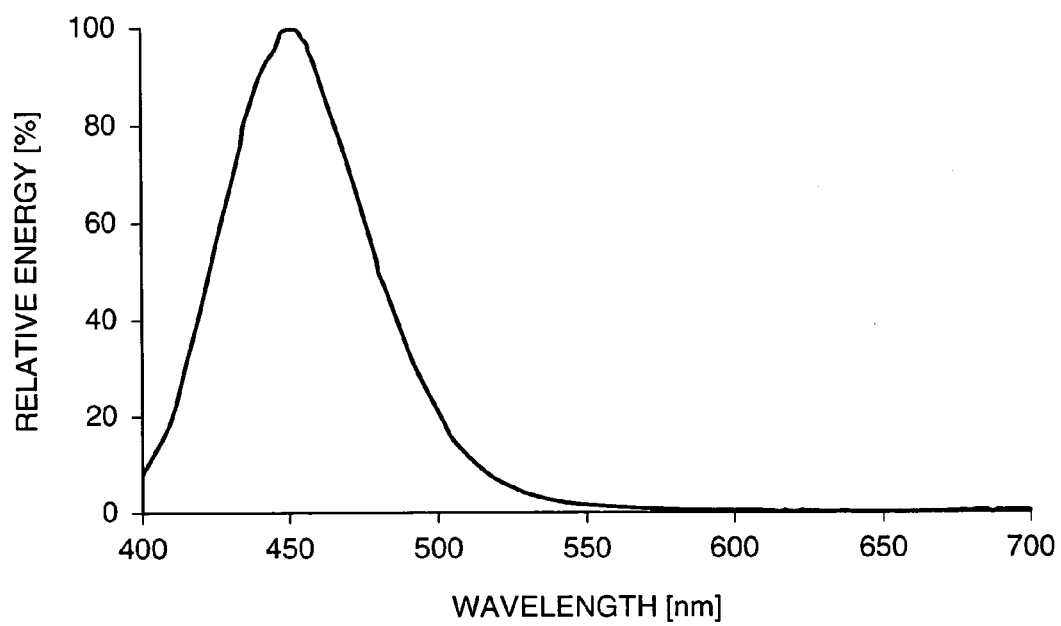
FIG. 7 is an emission energy distribution diagram of a video projection tube for blue.

Irradiation lights of three-color projection tubes 21, 22, 23 for use in the back projection type video display device will be described. FIG. 5 shows the video projection tube for red, FIG. 6 shows the video projection tube for green, and FIG. 7 shows a wavelength characteristic of an emitted light of the video projection tube for blue. These are indicated in a relative energy assuming that a maximum value is 100%. As shown in FIG. 5, the light emitted from the video projection tube for red 21 has a peak at 610 nm, and an energy in the vicinity of the peak occupies most of the light (hereinafter referred to as the luminescent line). The light emitted from the video projection tube for green 22 has a luminescent line at 543 nm as shown in FIG. 6. On the other hand, the light emitted from the video projection tube for blue 23 forms a gentle crest having a peak at 450 nm as shown in FIG. 7.

Figure 8:
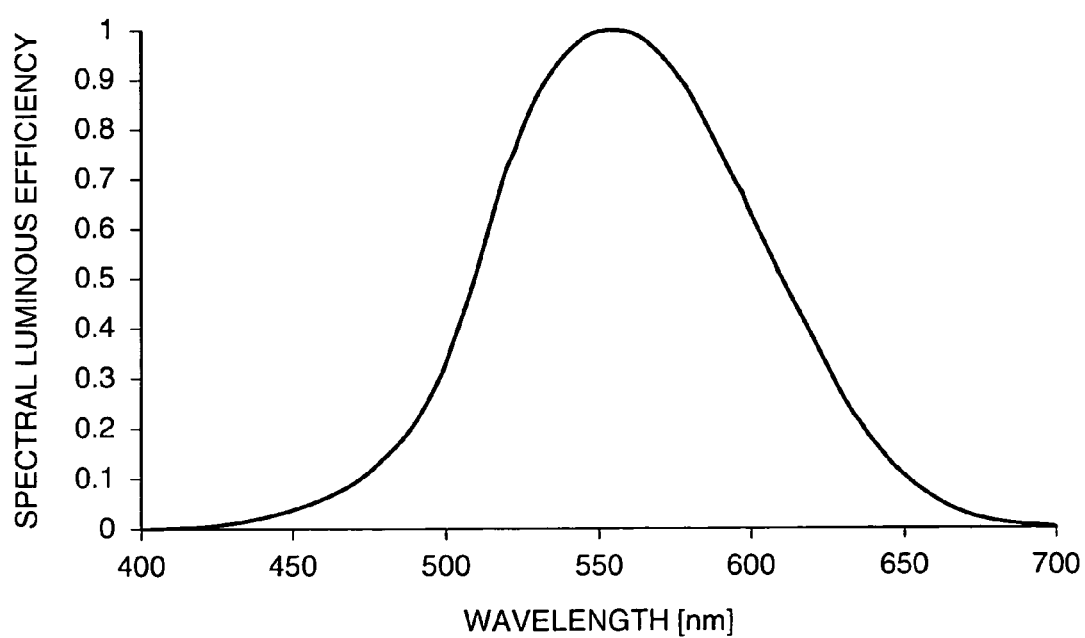
FIG. 8 is a spectral luminous efficiency diagram.

Moreover, people feel brightness in different ways depending on the wavelength, even when seeing the light having a constant energy. This will be referred to as the spectral luminous efficiency, and a spectral luminous efficiency curve is determined by International Commission on Illumination (CIE) as shown in FIG. 8. As seen from this, human eyes are most sensitive to an optical energy in the vicinity of 550 nm (green). That is, they are sensitive to the brightness of the green light in the vicinity of 543 nm. On the other hand, the sensitivity to the optical energy of 500 nm or less (blue) is not satisfactory, and there is hardly any sensitivity to blue even when the brightness slightly drops. The sensitivity in the vicinity of 610 nm (red) is 0.5 to 0.6, and is slightly lower than that to green.

Therefore, in the reflectance characteristic of FIG. 2, when the luminescent line of 543 nm of green is matched with a crest (b) of the ripple, the drop of the brightness can be minimized.

Figure 9:
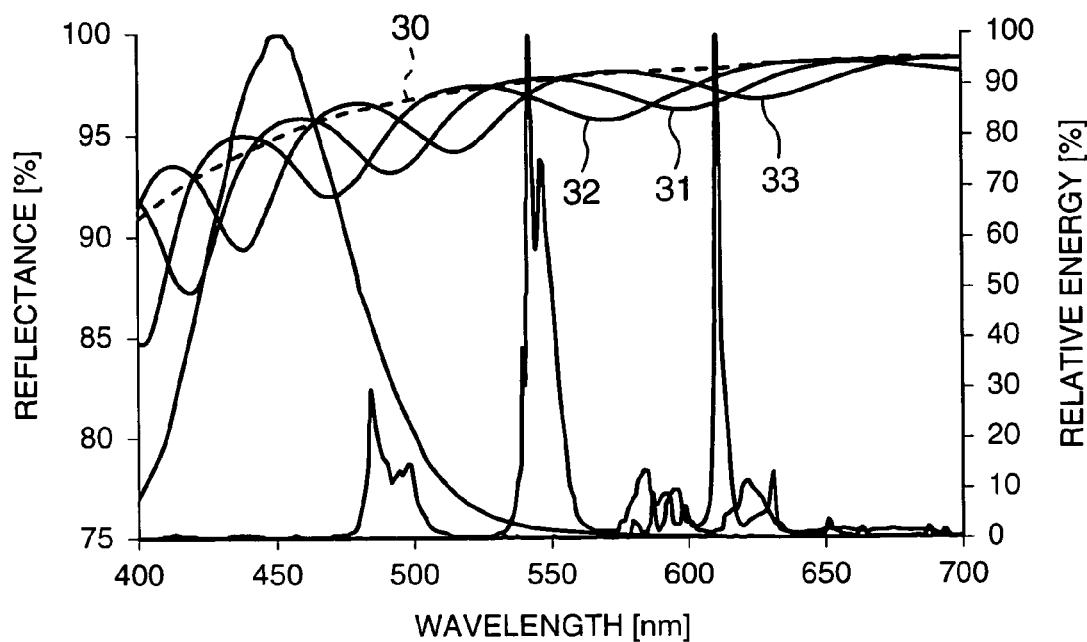
FIG. 9 is a diagram showing a relation between a reflectance characteristic of the back mirror and an emission energy distribution of each projection tube.

In FIG. 9, the wavelength characteristic of the emitted light of each projection tube is superposed upon the reflectance characteristic in a case where the acrylic urethane resin having a refractive index of 1.5 is used in the topcoat and the film thickness of the topcoat is varied. In FIG. 9, 31 denotes a reflectance characteristic at a time when the film thickness is 0.417 µm, 32 denotes a reflectance characteristic at a time when the film thickness is 0.397 µm, and 33 denotes a reflectance characteristic at a time when the film thickness is 0.437 µm. With the reflectance characteristic 31, a drop amount of the brightness by the topcoat is 0.7%. Assuming that an in-plane fluctuation is generated by 10%, the in-plane fluctuation is 0.042 µm, and can be reduced to ⅟₇ as compared with a case where the film thickness of the topcoat is 3 µm.

Here, when a dilution ratio, application pressure, application time and the like of the topcoat resin are controlled, the fluctuation of the film thickness can be set to ±0.02 µm or less. When the film thickness fluctuates by 0.02 µm, a maximum drop amount of the brightness at this time is 1% as apparent from the reflectance characteristics 32, 33 of FIG. 9. Therefore, when the film thickness is selected in order to match the wavelength of the crest of the ripple with the luminescent line 543 nm of the video projection tube for green 22, the drop in the brightness performance by the topcoat can be suppressed within 1%.

In the above-described embodiment, the resin having a refractive index of 1.5 has been described. However, when the refractive index of the topcoat resin is set to n, and the film thickness is determined in accordance with the following equation 1, the wavelength of the crest of the ripple can be substantially matched with the luminescent line 543 nm of the video projection tube for green 22.

$$0.626/n + 0.02 \ [\mu m] \quad \text{(Equation 1)}$$

The above equation 1 is derived by use of software for simulation of optical thin film software "FILM*STAR" of U.S. FTG Software Associates Co. In the present embodiment, the wavelength of the crest of the ripple is matched with the luminescent line 543 nm of the video projection tube for green 22. However, an absolute amount of red is smaller than that of green. Therefore, in consideration of white balance, the wavelength may also be matched with the luminescent line 610 nm of the video projection tube for blue 23.

Furthermore, this does not determine the arrangement of the respective projection tubes for the colors 21, 22, 23. The video projection tube for blue 23, video projection tube for green 22, and video projection tube for red 21 may also be arranged from the left of FIG. 4.

Figure 10:
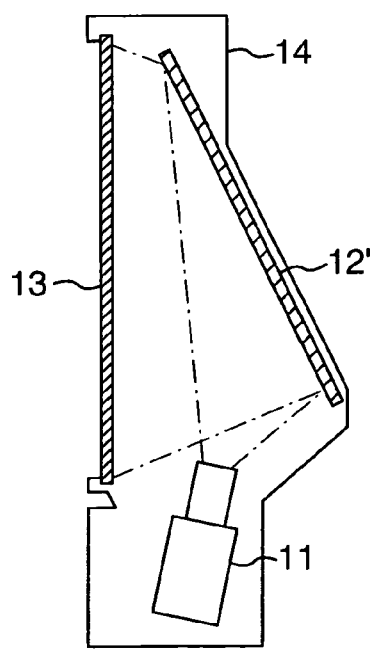
FIG. 10 is a sectional view of the back projection type video display device in which an optical unit is used.
Figure 11:
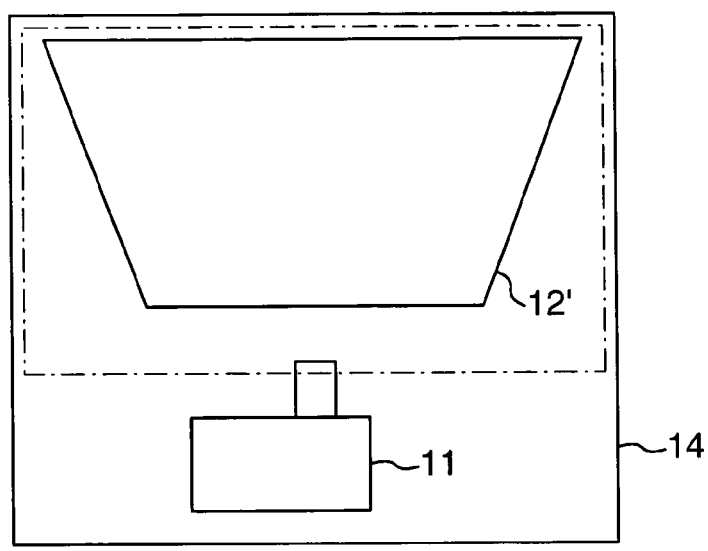
FIG. 11 is a front view of the back projection type video display device shown in FIG. 10.

Next, another embodiment will be described in which the back mirror by the present invention is applied to the back projection type video display device. FIG. 10 is a constitution sectional view of the back projection type video display device, and FIG. 11 is a front view of the device. In this display device, an optical unit is used in which an intensity of light from a light source (not shown) is modulated by display elements (not shown) such as a liquid crystal panel and a DMD including a large number of micro mirrors to form an optical image in response to a video signal (not shown), and the optical image is enlarged and projected by projection means (not shown). It is to be noted that in FIGS. 10, 11, components common with those of FIGS. 3, 4 are denoted with the same reference numerals, and the description thereof is omitted.

In FIGS. 10, 11, reference numeral 12' denotes a back mirror which is the reflective mirror by the present invention. As the back mirror 12', a mirror including a reflective surface formed of a silver film as shown in FIG. 1 is used. In the present embodiment, an optical unit 11 is used instead of the projection tubes 21, 22, 23 for emitting the video light in the back projection type video display device described with reference to FIGS. 3, 4, and the other components are similar to the back projection type video display device in which the projection tubes are used.

Figure 12:
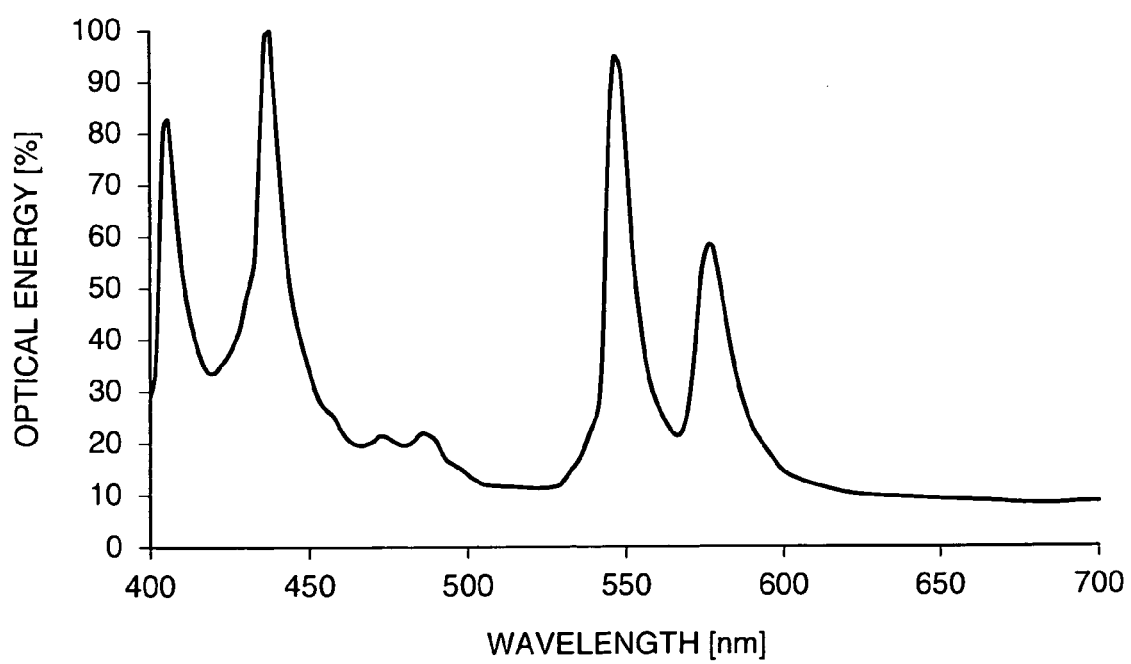
FIG. 12 is an emission energy distribution diagram of a light source.

In general, a high-pressure mercury lamp is used in the light source (not shown) of the optical unit 11. An optical energy distribution of the high-pressure mercury lamp is shown in FIG. 12. As shown in FIG. 12, the luminescent line of a band of green lies at 549 nm. Therefore, the film thickness of the topcoat may also be set so as to match the wavelength of crest of ripple with the luminescent line.

Figure 13:
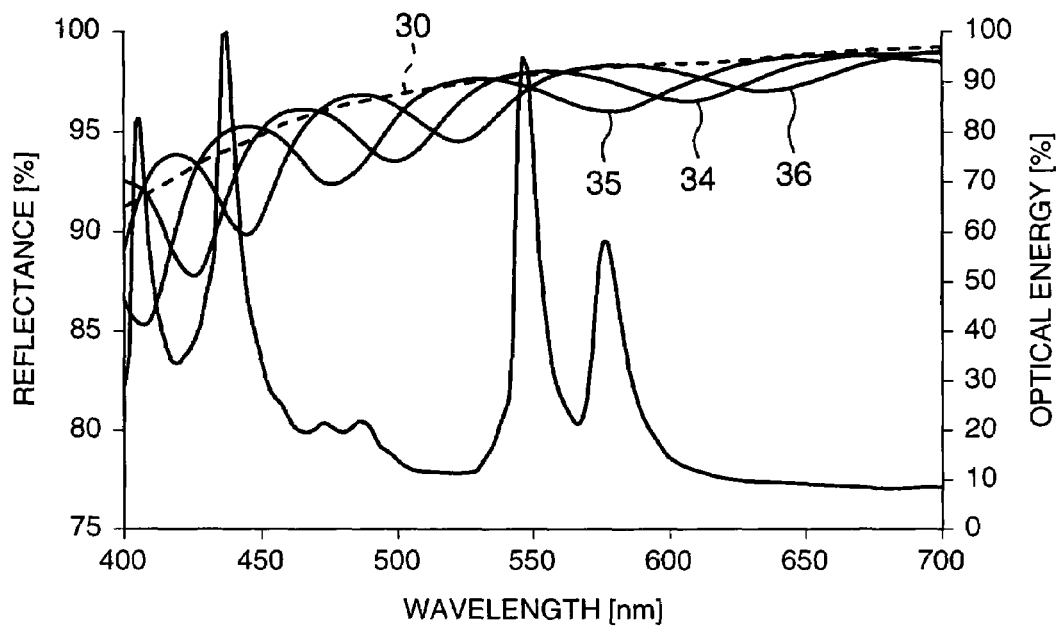
FIG. 13 is a diagram showing a relation between the reflectance characteristic of the back mirror and the emission energy distribution of the light source.

In FIG. 13, the wavelength characteristic of the light source (not shown) of the optical unit is superposed upon the reflectance characteristic in a case where the acrylic urethane resin having a refractive index of 1.5 is used in the topcoat and the film thickness of the topcoat is varied. In FIG. 13, 34 denotes a reflectance characteristic at a time when the film thickness is 0.423 μm, 35 denotes a reflectance characteristic at a time when the film thickness is 0.403 μm, and 36 denotes a reflectance characteristic at a time when the film thickness is 0.443 μm. When the film thickness fluctuates by ±0.02 μm in the same manner as in the above-described embodiment, the drop in the brightness with this maximum fluctuation is 0.8%.

In the above-described embodiment, the acrylic urethane resin having a refractive index of 1.5 has been described. However, when the refractive index of the topcoat resin is set to n, and the film thickness is determined in accordance with the following equation 2, the crest of ripple can be substantially matched with the luminescent line 549 nm of green of light source.

$$0.635/n \pm 0.02\ [\mu m] \quad \text{(Equation 2)}$$

The above equation 2 is derived by the use of software for simulation of optical thin film software "FILM*STAR" of U.S. FTG Software Associates Co. in the same manner as in Equation 1.

Moreover, when a component of yellow (crest in the vicinity of 577 nm) is included in green in the above-described embodiment, the color turns to yellowish green, and color purity drops. When the component is included in red, the color turns to orange, and the color purity drops. Therefore, since the yellow component is unnecessary for securing the color purity. Therefore, there is also a method of substantially matching the wavelength of valley of ripple with 577 nm.

Next, reliability of resistance to environment will be described. When the film thickness of the topcoat is reduced, the degradation of the reflective film by sulfuration or oxidation is feared. Therefore, the topcoat was formed of the acrylic urethane resin, a sample having a small topcoat film thickness of 0.2 μm was prepared as compared with the above-described embodiment, and a mixed gas test described in the following document was conducted as a test of reliability of resistance to environment. Test conditions were $H_2S$ gas: 1500 ppb, $NO_2$ gas: 3000 ppb, temperature: 30° C., relative humidity: 70% RH, time: 96 hours (four days). This is an acceleration test, and the condition corresponds to five years in Asian districts (20 years in Europe and America) in accordance with "Development of Mixed Gas Corrosion Test Method in accordance with Asian Environments" 7th Symposium on Reliability of Electronic Device, November, 1997, pp. 83 to 88. Any disappearance of the reflective film and drop in reflectance were not seen in a test piece having a topcoat film thickness of 0.2 As described above, in accordance with the present invention, the topcoat of the transparent resin including a single layer and having a film thickness of 1 μm or less is used as the protective film of the back mirror. Accordingly, it is possible to provide a reflective mirror whose contrast and resolution performances are equal to those of the surface mirror of the glass mirror for general use and in which there is not any problem in the reliability of resistance to environment, the color shift or brightness performance is inhibited from being degraded, and cost reduction is possible. Therefore, in accordance with the present invention, both high image quality and low price can be established.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A back reflective mirror which is used in a back projection type video display device for projecting an optical image from a back side of a screen in response to a video signal by a projection unit and which changes an optical path of a projected video light from the projection unit in a screen direction, the mirror comprising:
   a glass substrate;
   a reflective film of silver or a silver alloy forming a reflective surface on the glass substrate; and
   a topcoat film formed of a transparent resin on the reflective film, wherein the topcoat film has a film thickness of 1 μm or less.

2. The back reflective mirror according to claim 1, wherein the topcoat film has a film thickness of 1 μm or less.

3. The back reflective mirror according to claim 1, wherein the topcoat film is formed of an acrylic resin.

4. A back reflective mirror which is used in a back projection type video display device including a red projection tube, a green projection tube, and a blue projection tube for projecting optical images in response to red, green, and blue video signals to project the optical images from a back side of a screen by the respective projection tubes and which changes optical paths of projected video lights from the projection tubes in a screen direction, the mirror comprising:
   a glass substrate;
   a reflective film of silver or a silver alloy forming a reflective surface on the glass substrate; and
   a topcoat film formed of a transparent resin on the reflective film, wherein the topcoat film has a film thickness of 1 μm or less, wherein a film thickness of the topcoat film is set based on a refractive index of the topcoat film.

5. The back reflective mirror according to claim 4, wherein a reflectance characteristic of the back reflective mirror has a ripple shape by the topcoat film with respect to a wavelength, and
the wavelength of any crest of the ripple shape indicated by the reflectance characteristic agrees with that of a luminescent line of light emitted from the green projection tube.

6. The back reflective mirror according to claim 4, wherein assuming that the refractive index of the topcoat film is n, the film thickness of the topcoat film satisfies a condition of $0.626/n \pm 0.02$ μm.

7. The back reflective mirror according to claim 4, wherein a reflectance characteristic of the back reflective mirror has a ripple shape by the topcoat film with respect to a wavelength, and
the wavelength of any crest of the ripple shape indicated by the reflectance characteristic agrees with that of a luminescent line of light emitted from the red projection tube.

8. A back reflective mirror which is used in a back projection type video display device for modulating a light intensity of light from a light source by a display element to form an optical image in response to a video signal and for projecting the optical image from a back side of a screen by an optical unit and which changes an optical path of a projected video light from the optical unit in a screen direction, the mirror comprising:
a glass substrate;
a reflective film of silver or a silver alloy forming a reflective surface on the glass substrate; and
a topcoat film formed of a transparent resin on the reflective film, wherein the topcoat film has a film thickness of 1 μm or less,
wherein a film thickness of the topcoat film is set based on a refractive index of the topcoat film.

9. The back reflective mirror according to claim 8, wherein a reflectance characteristic of the back reflective mirror has a ripple shape by the topcoat film with respect to a wavelength, and
the wavelength of any crest of the ripple shape indicated by the reflectance characteristic agrees with that of a green luminescent line of light emitted from the light source of the optical unit.

10. The back reflective mirror according to claim 9, wherein assuming that the refractive index of the topcoat film is n, the film thickness of the topcoat film satisfies a condition of $0.635/n \pm 0.02$ μm.

11. The back reflective mirror according to claim 8, wherein a reflectance characteristic of the back reflective mirror has a ripple shape by the topcoat film with respect to a wavelength, and
the wavelength of any valley of the ripple shape indicated by the reflectance characteristic agrees with that of a yellow luminescent line of light emitted from the light source of the optical unit.

12. A back projection type video display device comprising:
a video generation source for forming an optical image in response to a video signal;
a screen;
a projection unit for projecting the optical image formed by the video generation source onto a back face of the screen; and
a back reflective mirror for changing an optical path of a projected video light from the projection unit in a screen direction, the mirror including:
a glass substrate;
a reflective film of silver or a silver alloy forming a reflective surface on the glass substrate; and
a topcoat formed of a transparent resin on the reflective film, wherein the topcoat film has a film thickness of 1 μm or less.

13. A back projection type video display device comprising:
a red projection tube, a green projection tube, and a blue projection tube for forming optical images in response to red, green, and blue video signals;
a screen;
a projection unit for projecting the red, blue, and green optical images formed by the respective projection tubes from a back side of the screen; and
a back reflective mirror for changing optical paths of projected video lights from the projection tubes in a screen direction, the mirror including:
a glass substrate;
a reflective film of silver or a silver alloy forming a reflective surface on the glass substrate; and
a topcoat formed of a transparent resin on the reflective film, wherein the topcoat film has a film thickness of 1 μm or less.

14. A back projection type video display device comprising:
a light source for radiating light;
a display element for modulating an intensity of the light from the light source to form an optical image in response to a video signal;
a screen;
an optical unit for projecting the optical image formed by the display element from a back side of the screen; and
a back reflective mirror for changing an optical path of a projected video light from the optical unit in a screen direction, the mirror including:
a glass substrate;
a reflective film of silver or a silver alloy forming a reflective surface on the glass substrate; and
a topcoat formed of a transparent resin on the reflective film, wherein the topcoat film has a film thickness of 1 μm or less.

* * * * *